United States Patent [19]

Sessa

[11] 4,194,605

[45] Mar. 25, 1980

[54] MOTOR VEHICLE WINDOW REGULATOR

[76] Inventor: Terenzio Sessa, Via Albani 5, Varese, Italy

[21] Appl. No.: 854,141

[22] Filed: Nov. 23, 1977

[30] Foreign Application Priority Data

Jan. 20, 1977 [IT] Italy .............................. 19493 A/77

[51] Int. Cl.[2] .......................... F16D 7/02; F16D 13/12; F16D 67/02

[52] U.S. Cl. ..................................... 192/12 R; 49/352; 64/30 E; 192/56 C; 192/74; 192/81 C

[58] Field of Search .............. 192/12 R, 12 BA, 41 S, 192/56 C, 74, 81 C, 8 C; 74/531; 49/352; 64/30 E

[56] References Cited

U.S. PATENT DOCUMENTS

| | | | |
|---|---|---|---|
| 620,916 | 3/1899 | Hafner | 64/30 E |
| 823,971 | 6/1906 | Remondy | 192/8 C |
| 1,699,204 | 1/1929 | Nicholson | 192/8 C |
| 2,498,843 | 2/1950 | Pile | 192/81 C |
| 2,626,029 | 1/1953 | Gutterman | 192/56 C |
| 3,851,499 | 12/1974 | Noguchi | 64/30 E |
| 4,026,071 | 5/1977 | Sessa | 49/352 |

*Primary Examiner*—Allan D. Herrmann
*Attorney, Agent, or Firm*—Shlesinger, Fitzsimmons & Shlesinger

[57] ABSTRACT

This invention relates to a motorized window regulator for motor vehicles, which regulator is provided with a torque limiting mechanism of particularly advantageous construction and operation. According to the invention, a motor transmits motion to the window via a kinematic operating linkage, which comprises a cylindrical surface on which a spiral spring with preloaded turns is interference mounted. The ends of the spring engage alternately with a stop rotating coaxially to the surface such that they become urged to deform the spring in opposition to its preloading, so as to withdraw it resiliently from the cylindrical surface.

4 Claims, 6 Drawing Figures

MOTOR VEHICLE WINDOW REGULATOR

This invention relates to a motorised motor vehicle window regulator provided with a torque limiting mechanism of particularly advantageous construction and operation.

Electrically driven window regulators are known, provided with an electric motor having a power sufficient to raise the window, but at the same time such as to enable it to be halted by applying a relatively low resisting force thereto, such that no accidents can arise when parts of the body, as for example the fingers of the hands, are placed between the window and the arresting member.

However, such window regulators have various drawbacks.

Firstly, in order to ensure that they operate correctly with a low torque electric motor, the greatest care must be taken in assembling the system. Independently of this, they are also affected by alterations in the operation of the system caused for example by voltage variations in the electrical system and by external atmospheric agents which generally cause hardening and jamming, leading to overheating of the electric motor, to which a torque is applied which approximates to the limiting stop torque. Under these conditions, the life of the motor is limited.

To obviate the aforesaid drawbacks, it is known to use motors of an excessive power, which however make the system dangerous when parts of the body are inadvertently placed between the window and arresting member when the window is closing.

It is thus desirable for such motor vehicle window regulators driven by an electric motor of high power to be provided with a torque limiting mechanism, to prevent parts of the body of the vehicle occupants from being gripped with a large force between the window and arresting member during the window closure, and which could be dangerous especially for small children.

For this reason, it is already known to fit torque limiting mechanisms to motorised window regulators, and which, when the motor is operating, enable the window to be halted in an intermediate upward position by applying thereto a force which is substantially lower than the torque transmitted by the motor, which is normally of several dozen kg.

Torque limiting devices are known, consisting of friction discs with friction material, pressed together by springs.

However, devices of this type have various drawbacks. Firstly, on assembly, the springs, which are generally of the Belleville type, must be set with a certain accuracy.

Furthermore, the reliability of these devices is substantially impaired by the entry of dirt, by the external atmospheric conditions and by their age.

The object of the present invention is therefore to obviate the drawbacks of the known art by providing a torque limiting mechanism for motor vehicle window regulators, which is of simple, economical and compact construction and of extremely accurate operation which is reliable with time and is not influenced by external atmospheric agents, temperature, humidity etc.

This object is attained according to the invention by a motor vehicle window regulator in which a motor transmits motion to the window via a kinematic operating linkage, wherein said kinematic linkage comprises a cylindrical surface on which a spiral spring with preloaded turns is interference mounted, the ends of the spring engaging alternately with a stop rotating coaxially to the surface such that they become urged to deform the spring in opposition to its preloading, so as to withdraw it resiliently from the cylindrical surface.

The structural and operational characteristics of the invention and its advantages will be more evident from the description given hereinafter by way of example with reference to the accompanying drawings, in which.

Figure 4:
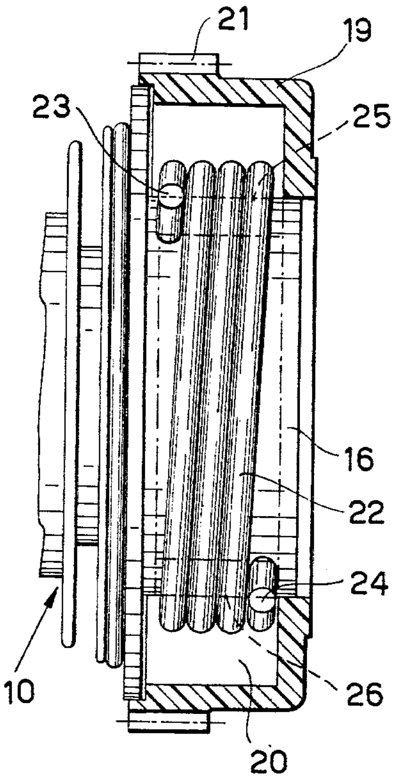
FIG. 4 is a section through a detail on the line IV—IV of FIG. 2.
Figure 1:
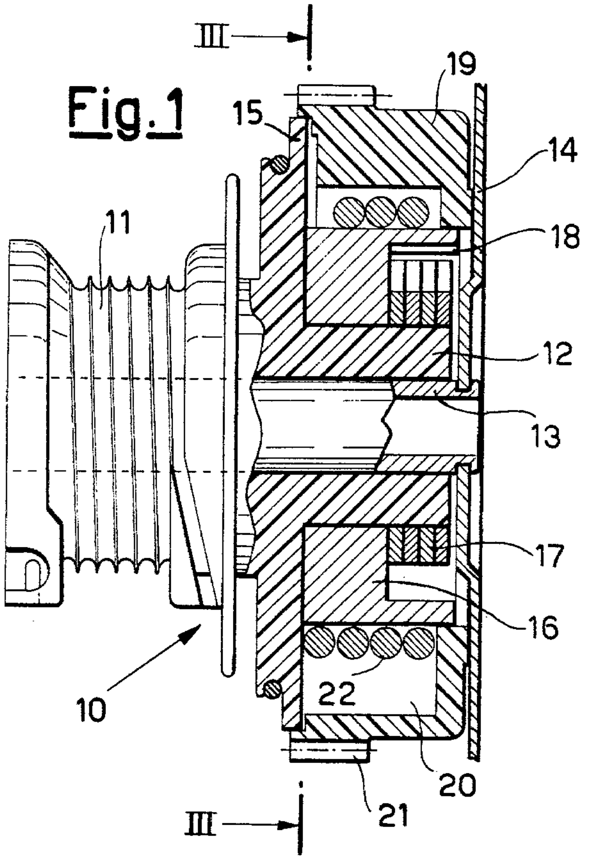
FIG. 1 is a partly sectional elevation on the line I—I of FIG. 2, of a window regulator of cable type incorporating a torque limiting mechanism according to the invention.

The drawings show by way of example a window regulator of the cable type which may, for example, be of like construction to that described and illustrated in Italian patent No. 927 030 and in the Italian patent applications No. 21244 A/75 (see corresponding U.S. Pat. No. 4,026,071, granted May 31, 1977) and No. 23049 A/76 of the same applicant.

The window regulator according to the invention (FIGS. 1 to 4) is indicated overall by 10 and is formed from a grooved pulley 11 about which is wound the cable which raises and lowers the window. The pulley 11 comprises a hub 12 rotatable on a shaft 13 jutting from a plate 14 to be fixed to the motor vehicle door. The hub 12 comprises an annular flange 15 against which rests a socket 16 fixed to the hub. In the socket is housed a pile of discs 17 mounted on the hub 12, and cooperating with a ledge 18 on the inner face of the socket 16 with the purpose of arresting the rotation of the pulley 11 when in a predetermined limiting position corresponding to the open position of the window. This limiting system is well known in this field and is consequently neither described nor illustrated in greater detail. Such a system is for example described in the German patent application No. 1 708 164.

Figure 3:
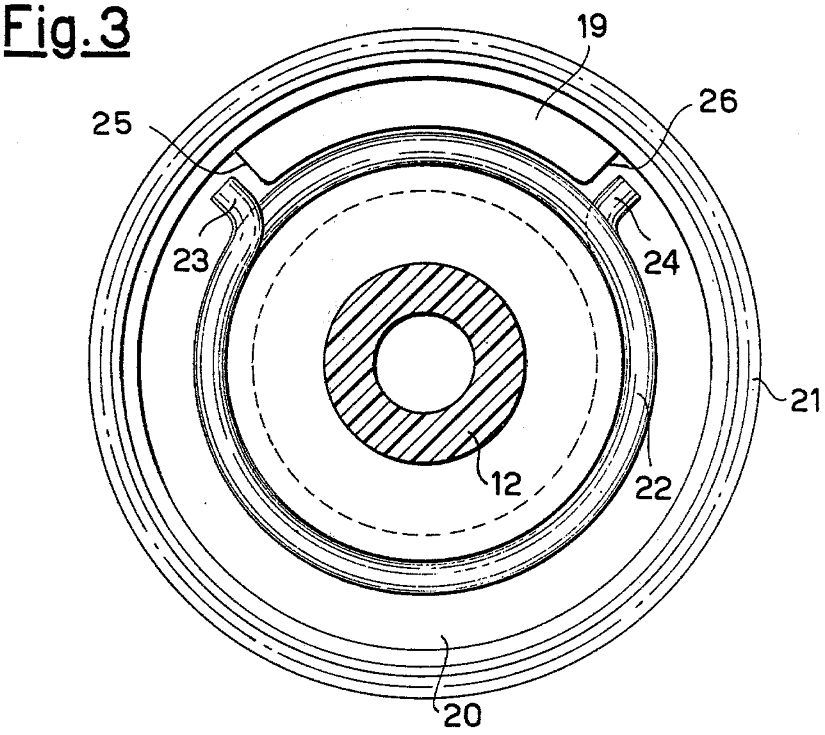
FIG. 3 is a section on the line III—III of FIG. 1.

A cover 19 is mounted on the socket 16 to form therewith an annular seat 20, the cover comprising an integral external gear 21. The gear 21 is driven by the electric motor of the window regulator (not shown) via a suitable transmission train (also not shown), and is rotatably coupled or clutched to the socket 16, and hence with the hub 12 and pulley 11, via a helical torsion spring 22, the two ends 23, 24 of which are bent radially outwards and abut against respective stops or ledges 25, 26 provided on the inner annular face of the cover 19 (FIG. 3).

The cylindrical spring 22 is suitably preloaded with a loading less than the torque transmitted by the electric motor, and its inner diameter is substantially less than the outer diameter of the socket 16, on which the spring 22 is thus mounted with a certain degree of interference such that it is clamped with a certain frictional force to the socket 16. This clamping force depends obviously on the preloading of the spring 22, its number of turns, the cross-section of the wire with which it is constructed, and said degree of interference.

Movement from the driven gear 21 is therefore transmitted to the pulley 11 in one or other direction of rotation via the kinematic linkage formed by the cover 19, spring 22, socket 16 and hub 12.

When a resisting torque exceeding a certain limit is applied to the pulley 12 via the window and cable (not shown), this torque is transmitted through the hub 12, socket 16 and one of the two ends 23, 24 of the spring 22 abutting against the respective ledge 25, 26, to oppose the rotation of the cover 19 driven by the gear 21 from the motor. Under these conditions, the spring 22 is urged to unwind until it slides relative to the hub 12, so that motion transmission from the gear 21 to this latter and consequently to the pulley 11 ceases while said resisting torque is applied to the pulley 11.

When the abnormal operating condition ceases, the spring 22 returns resiliently to its initial position.

By suitably calculating the preloading of the spring 22, it is easy to make it slide relative to the hub 16 when a resisting torque is applied to the pulley 11 via the window, which exceeds a certain safety limit beyond which it would be personally dangerous for a part of the body to become caught between the window and relative arresting member. The spring preloading is however such as to prevent the window being lowered from the outside of the vehicle.

Figure 5:
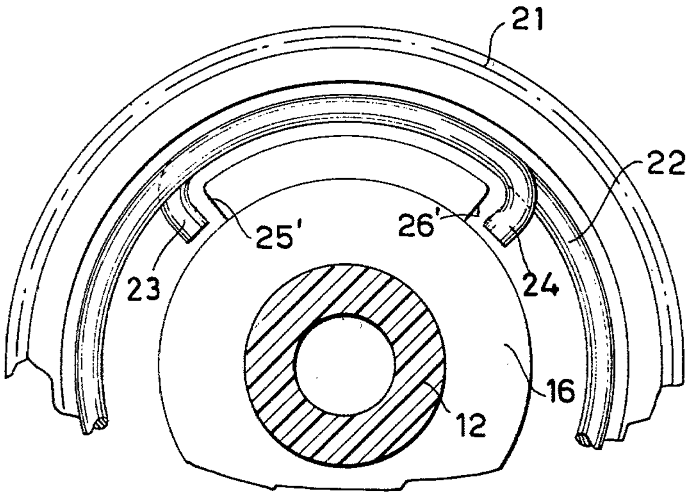
FIG. 5 is a detail of a modification taken on the line V—V of FIG. 6, in a similar manner to FIG. 3.
Figure 6:
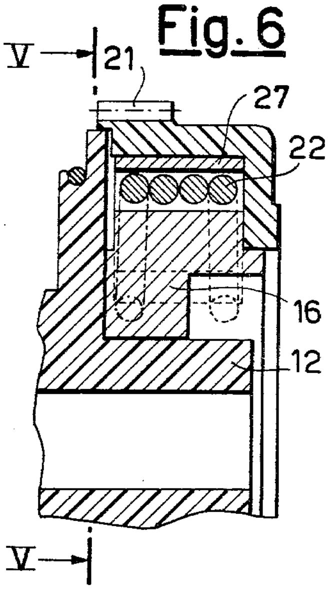
FIG. 6 is a section through the detail of the modification of FIG. 5.
Figure 2:
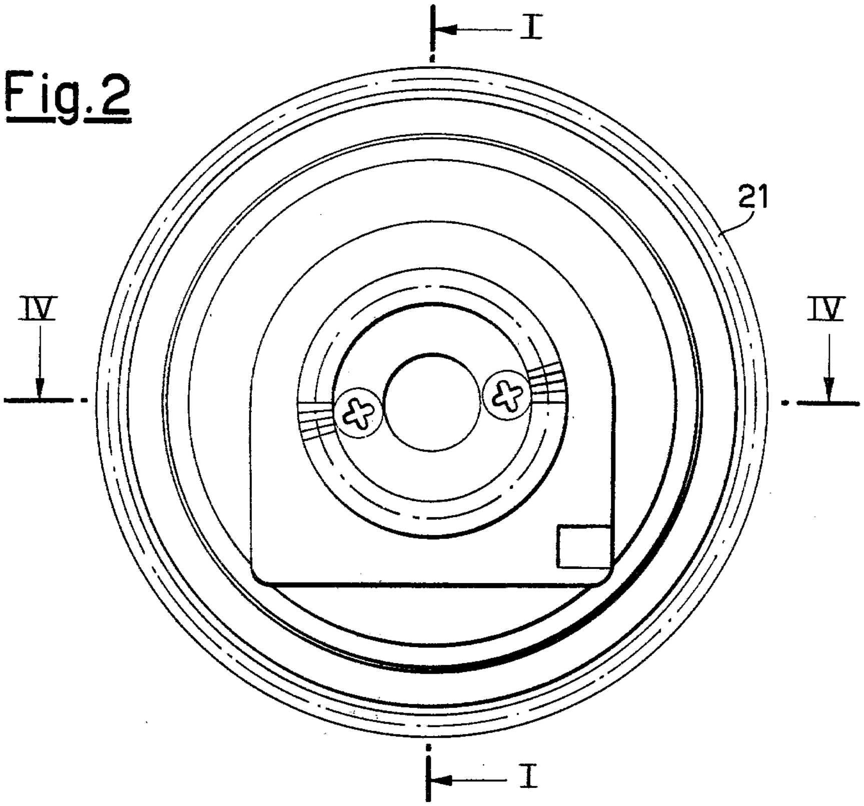
FIG. 2 is an elevation in the direction of the arrow of FIG. 1.

Although one possible embodiment of the invention has been illustrated and described, modifications may be made to it without leaving the scope of the inventive idea. For example (FIGS. 5 and 6) the stops or ledges 25, 26 may be provided on the socket 16 instead of on the cover 19, and the spring 22 may be forced against the inner annular face of the cover 19 instead of on to the socket 16. As the cover 19 is generally of plastics, its inner face would be lined with a suitable ferrous material 27 for this purpose. With such a construction, the spring 22 would withdraw by winding about itself and not unwinding as in the case of the embodiment shown in FIGS. 1 to 4.

The torque limiting mechanism according to the invention may also be fitted to window regulators of a construction different from that shown and described here and in the aforesaid patents, whether they are of the cable or a different type.

However, it is particularly advantageous to fit it to cable regulators of the type illustrated, as it does not notably influence the total overall size, this being of considerable importance in this field.

The scope of the invention is therefore defined only by the following claims.

What we claim is:

1. A motor vehicle window regulator of the type in which a motor transmits motion to the window via a torque limiting mechanism, said mechanism comprising

- a pair of members mounted for coaxial rotation relative to each other, and at least one of said members having thereon a cylindrical surface,
- a spiral spring interposed between said members and having preloaded turns frictionally engaged with said cylindrical surface normally to transmit rotation from said one to the other member, and vice versa, and
- a ledge on said other member engageable by one of the ends of said spring to deform the spring in opposition to its preloading, so as to withdraw it resiliently from frictional engagement with the cylindrical surface when the torque between said members exceeds a predetermined amount,
- said cylindrical surface being the outer surface of a socket rigid with the hub of a winding pulley for the cable of a cable window regulator, and said socket containing a stack of discs for halting the rotation of said pulley in a limiting position in which the window is lowered, and said ledge is rigid with a gear driven by the motor.

2. A device as claimed in claim 1, wherein said gear is formed on an outer cylindrical jacket which surrounds said socket in the form of a cover and abuts against a flange rigid with said hub.

3. A device as claimed in claim 2, wherein said spring is housed in an interspace formed between the outer cylindrical surface of said socket and an inner cylindrical surface of said cover, said surfaces being coaxial to each other and to the pulley hub.

4. A motor vehicle window regulator device of the type in which a motor transmits motion to the window via a torque limiting mechanism said mechanism, comprising

- a pair or members mounted for coaxial rotation relative to each other, and at least one of said members having thereon a cylindrical surface,
- a spiral spring interposed between said members and having preloaded turns frictionally engaged with said cylindrical surface normally to transmit rotation from said one to the other member, and vice versa, and
- a ledge on said other member engageable by one of the ends of said spring to deform the spring in opposition to its preloading, so as to withdraw it resiliently from frictional engagement with the cylindrical surface when the torque between said members exceeds a predetermined amount,
- said cylindrical surface being the inner annular surface of a gear driven by said motor, and said ledge extending from the outer surface of a socket rigid with the hub of a winding pulley for a cable window regulator, said socket containing a stack of discs which halt the rotation of said pulley in a limiting position in which the window is lowered.

* * * * *